United States Patent [19]
Richard

[11] Patent Number: 4,787,920
[45] Date of Patent: Nov. 29, 1988

[54] SCRUBBER FILTER
[76] Inventor: Donald E. Richard, Rte. 3, Box 205A, Rockport, Ind. 47635
[21] Appl. No.: 96,248
[22] Filed: Sep. 8, 1987

Related U.S. Application Data
[63] Continuation-in-part of Ser. No. 4,113, Jan. 16, 1987, abandoned.
[51] Int. Cl.⁴ ............................................. B01D 53/14
[52] U.S. Cl. ........................................ 55/90; 55/233; 55/477; 55/257.1
[58] Field of Search ................................. 55/185–188, 55/257 R, 259, 233, 477, 90, 97, 242

[56] References Cited
U.S. PATENT DOCUMENTS 1,700,126  1/1929  Goodloc .................. 55/477
2,027,906  1/1936  Hand ....................... 55/477
3,538,657  11/1970 Macrow ................. 55/477 X
3,957,464  5/1976  Teller ...................... 55/68
4,175,933  11/1979 James ..................... 55/259
4,229,386  10/1980 Lerner ................. 55/477 X Primary Examiner—Charles Hart
Attorney, Agent, or Firm—Cohn, Powell & Hind

[57] ABSTRACT

A scrubber filter used, for example, in connection with a flooded bed scrubber system, characterized as a series of nylon or plastic brushes arranged, in rows, within a frame and overlaid with mesh, where the filter is disposed, during use, in a tilted relationship, i.e. tilts forward in the direction of oncoming contaminated air. In an alternative approach, the filter may be oriented angularly in a lateral direction with respect to such contaminated air. In any event, the density of the brushes at the tilted/angled position serves for the effective capture of micron particles, where larger particles are lodged, and subsequently displaced, on and from the aforesaid mesh.

20 Claims, 1 Drawing Sheet

U.S. Patent     Nov. 29, 1988     4,787,920
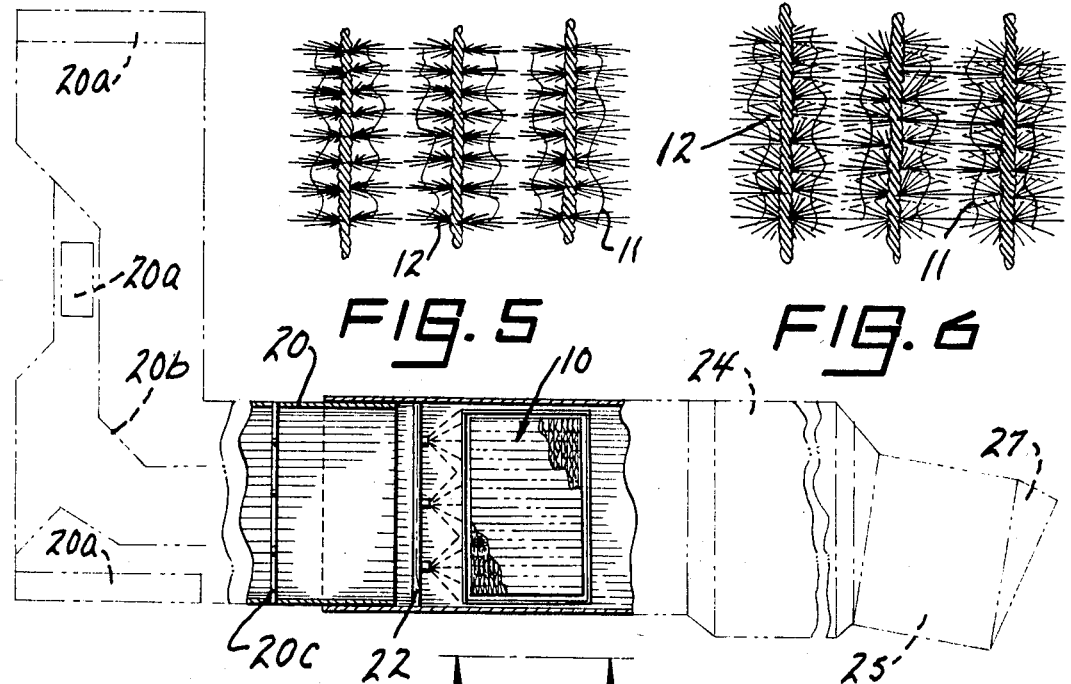
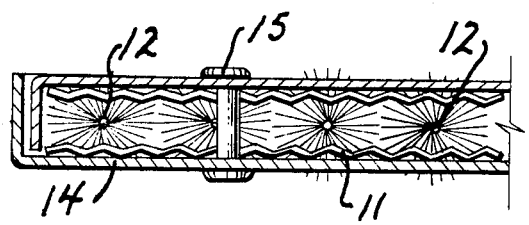
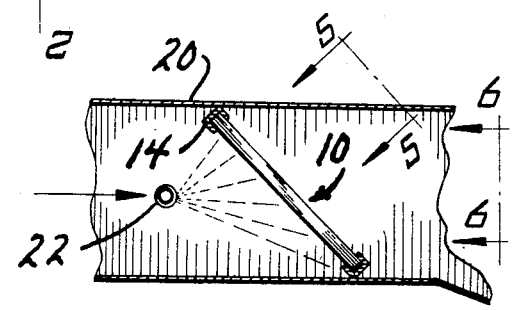
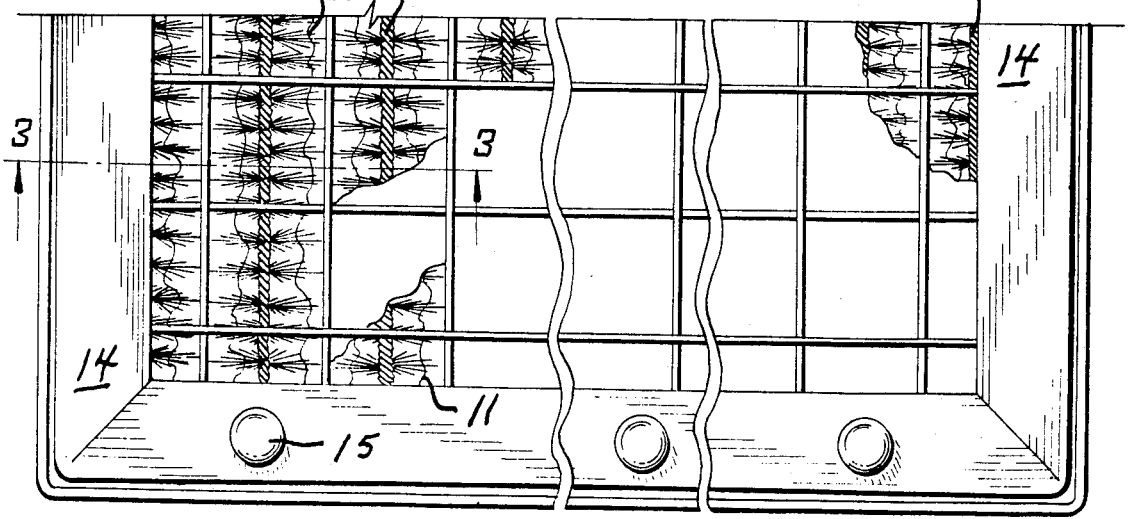

SCRUBBER FILTER

This is a continuation-in-part of application Ser. No. 004,113 filed on Jan. 16, 1987 now abandoned.

As is known, the elimination, or at least the minimizing, of contaminates, i.e. high dust concentrates, in the moving air at a mining site, as in underground coal mining, plays considerable significance, serving important health needs for the workers. The preceding is accomplished, heretofore, in a variety of approaches, as the use of mechanical arrangements oftentimes requiring frequent and/or continual maintenance, and which, in many instances, achieve less than the desired end results.

A typical system, identified as a flooded bed scrubber in the trade, used in connection with an underground continuous miner machine, involves ductwork including, by way of example, air inlets, a spray arrangement-scrubber combination, a demister, a common exhaust fan and, usually, a deflector. The preceding, operable in an area generating high dust concentrations by an unstable clod above the coal seam that is mined with the coal, is generally unsatisfactory because the ductwork fills primarily with float and respirable dust, requiring, therefore, continued cleanout for pluggage removal, as through ports, and the periodic replacement of the conventional screen of the scrubber filter, which rapidly becomes plugged in use with dust particles, particular those of between about 25-100 microns. These particles embed themselves in the conventional screen filter in the form of a hard, wet cake which can not be readily removed in the wet condition. As a result, continuous use of the system normally requires at least three screens so that two screens can be drying prior to being cleaned while one screen is in use. When the screen is completely dry the hard, dry cake can be removed by firmly tapping the frame of the screen on a hard object. The filter cake breaks up and falls out of the screen. But, this method is not satisfactory when the filter cake is wet and tightly adhering in the screen.

The invention herein, serving manifold end purposes, minimizes maintenance, i.e. the aforesaid screen replacement, among others, being mostly self-cleaning; presents an arrangement forming a dense media for capturing 10 micron and smaller dust particles, as well as respiralable dust particles; lowers "fan stalling" which increases fan noise at the operator's station due to increased static pressure in front of the fan); and, a slower build-up in pressure loss—an advantage because of the fewer replacement screens required. Only one of applicant's screens is required for each flooded bed scrubber in use, since the screen is essentially self cleaning. The screen can be removed from the flooded bed scrubber and gently tapped out on a firm surface to clear the screen of any embedded particles in a matter of seconds, even when wet. The screen can then be replaced in the flooded bed scrubber and returned to service. This procedure can be conveniently performed in the space of a minute or two at the beginning of each shift. Therefor, no additional screens other then the one present in the scrubber are required thus reducing the total number of screens needed to only one.

Briefly, the preceding is accomplished by a filter defined by, preferably, rows of nylon bristles, combined with stainless steel mesh and disposed within a stainless steel frame, and, when in a use position, angled and/or tilted with respect to the oncoming contaminated air.

THe aforesaid angling and/or tilting, in combination with the brush row spacing, serves to form a dense media jfor effectively capturing ten micron and smaller dust particles, as well as larger particles, by wetting the particles and embedding the particles in the water droplets produced by the scrubber spray.

In addition to drastically reducing filter replacement over the filtering arrangements currently in use, the filter of the invention satisfies critical operational requirements, e.g. permitting, in one instance, an air flow of 7000-8000 cfm to cross the filter at two to three inches of water pressure drop. The air flow through a flooded bed scrubber of the conventional type, having a typical plenum area of about 2 feet by 3 feet is in the order of between about 6,500 to 8,000 cfm. Under these conditions a pressure drop of between about 2 to 4 inches of water is typical. Typical operation conditions of flooded bed scrubbers may be in a flow range of between about 6,500 to 7,000 cfm through the noted conventional plenum with a pressure drop of between about three to four inchesof water. Stalling of the fan occurs when the air flow drops below about 5,000 to 5,200 cfm. In the stall position the fan produces an excessive amount of noise, typically sufficient to render the ambient noise level above industry and health standards. If the filter is not sufficiently restrictive and the pressure drop through the system drops below the 2 to 3 inches of water range, the air velocity may increase to the point where the scrubbing is rendered inefficient. That is, the water spray is not able to sufficiently wet the dust particles so that they may be removed from the air stream. As a result, entrained particles continue through the system and impinge against the demister baffles, and even the fan blades, which are located down stream of the scrubber. This can mean that the fan becomes cakes with solid particles and is thus rendered ineffective at moving air throught the system.

In any event, a better understanding of the present invention will become more apparent from the following description, taken in conjunction with the accompanying drawing, wherein FIG. 1 is a schematic plan view of a scrubber system utilizing a filter in accordance with the teachings of the present invention;

FIG. 2 is a view in side elevation, taken at line 2—2 on FIG. 1 and looking in the direction of the arrows, illustrating the placement of the instant filter at a use condition;

FIG. 3 is a view in side elevation, taken at line 3—3 on FIG. 4 and looking in the direction of the arrows, detailing the filter of the invention;

FIG. 4 is a plan view, partly fragmentary, further detailing the instant filter;

FIG. 5 is a fragmentary view of a portion of the filter, generally taken at line 5—5 on FIG. 2 and looking in the direction of the arrows; and, FIG. 6 is another fragmentary view of a portion of the filter, generally taken at line 6—6 on FIG. 2 and looking in the direction of the arrows, emphasizing the density of the filter at a tilted condition.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 3 and 4, the filter 10 of the inventoin is defined by generally parallel rows of brushes 12 (illustrated as vertically oriented in the figures, but also workable if horizontally disposed), in a compact but spaced apart relationship, disposed within a two-part frame 14 assembled by fasteners 15. In a preferred embodiment, the brush 12 bristles are made from nylon or plastic—in contrast to stainless steel mesh in prior filter arrangements—extending from twisted wire. On the other hand, frame 14 is stainless steel, where fasteners 15 are each copper.

The importance of the invention is particularly demonstrated by placement in a use condition (see FIGS. 5 and 6), where FIG. 6 illustrates the density achieved by brushes 12 when tilted during use, i.e. significantly contrasting to the direct viewing of such in FIG. 5. As stated, brushes 12 density, in a use position, forms or presents a media for effectively capturing 10 micron and smaller dust particles, as well as respirable dust particles, by coalescing the dust particles in the droplets of the water spray.

FIG. 1 illustrates a conventional use condition of filter 10, i.e. in connection with a flooded bed scrubber system, where the latter includes, in ductwork 20, air inlets 20a, a flow control vane 20b, hinge(s) 20c, a scrubber defined by the instant filter 10 and a water spray inlet 22, a demister 24, a common fan 25, and a deflector 27, each being representatively shown in the presented schematic diagram.

FIG. 2 discloses filter 10 at a preferred use condition, i.e. tilted forwardly into the direction of oncoming contaminated air movement, where the water from spray inlet 22 combines to present a scrubber function. While the showing of FIG. 2 is in side elevation, filter 10 angle may, in the alternative, be disposed transversely within ductwork 20, i.e. from side-to-side thereof—in contrast to tilting from the top to the bottom as shown—with further advantages over the filter positioning of prior approaches.

As to FIG. 4, again, filter 10 further includes a layer of fine mesh 11, typically stainless steel material, overlying the rows of brushes 12, such serving to trap large particles of contaminants (which are subsequently dislodged or removed with a few taps on the frame 14), where, as stated, the smaller particles are vibrated through the brush 12 rows.

With reference to the noted "fan stalling" problem inherent with earlier filters, filter 10, being mostly self-cleaning, maintains the pressure loss at fan 25 in a range out of a stall, which, at the same time, decreases noise at the operator's station. Also, because filter 10 replacement (or rotation) is minimized, loss and damage is minimized as well, representing important savings to the operator(s).

As shown in the drawings, the bristles of brushes 12 are shown as being closely adjacent, that is with zero overlap. It will be appreciated that the brushes may be overlapped, that is, by having the bristles of adjacent brushes interdigitated. The extent of overlap can vary from zero, with the brushes just touching, to about 50%, that is, with the bristles of a brush essentially touching the core of the adjacent brush. Preferably the overlap will be in the range of between about 25 to 50%. For purposes of clarity in illustration, the spacing of brushes 12 is shown as being substantially zero, in FIGS. 3-6. The brushes, as shown in FIG. 3 for example, are preferably placed with their axial cores substantially in the same plane. Brushes of a variety of sizes may be used to provide the desired dense apparent aspect when used as disclosed herein yet to also provide a sufficiently open structure that the filter itself is substantially self cleaning. It is preferred that wire wound brushes having a diameter of between 1 to 1½ inches be used. These brushes are preferably plastic bristle brushes, such as nylon or other equivalent plastic material, wound on a flexible core preferably a metalic wire core such as stainless stel or galvenized steel. The bristles of the brushes are helically wound in the twisted wire core and preferably have a pitch of about 5 to 6 turns per inch. Though it will be appreciated that other pitches may be used as long as the desired dense apparent aspect can be achieved with a suitable pressure drop. It will be appreciated that in use flooded bed scrubbers having applicant's filter will be effective at removing both the harmful dust, that is, dust having a particle size of less than about 10 microns, and larger particles as wells, for example, particles between about 25 to 100 microns. For purposes of reference, the smallest dust particle which can be seen by the unaided eye is about 50 microns in size. Applicant's disclosure herein describes the apparent dense aspect of applicant's filter as being achieved by inclining the filter from the vertical, it will be appreciated that the filter may be installed in the plenum with another orientation, such as inclination to the horizontal. Applicant's apparent dense aspect will be achieved as long as the inclination is at a non-perpendicular angle to the direction of flow of the air stream through the plenum. Typically the angle of inclination across the air stream is between about 30° to 60°, for example 45°, but the angle is not critical as long as an apparent dense aspect is achieved.

From the preceding, it should be evident that the filter scrubber presented herein serves effectiveness in use, combining with significant maintenance cost reduction. The important tilting and/or angular—lateral placement in the ductwork of the scrubber, while seemingly a simple approach, affords end results superior to those achieved by contaminated air filter (systems) in use heretofore.

The scrubber arrangement described above is susceptible to various changes within the spirit of the invention, including, by way of example, in filter proportioning; tilt angle range in use; the configuration of the overlying mesh; the number, length and spacing of the rows of brushes; and, the like. Thus, the preceding should be considered illustrative and not as limiting the scope of the following claims.

I claim:

1. In a method of scrubbing air with a flooded bed scrubber to remove dust particles generated by underground mining the improvement comprising conducting air containing dust through a flooded bed scrubber, spraying water into the air containing dust, conducting the air containing dust and water spray through a filter, the filter comprising a plurality of spaced apart brushes, the brushes being flexible bristles extending outwardly from axial cores, the brushes being placed with the cores thereof extending substantially parallel and extending substantially across the flow of air containing the dust and water spray, the axes of the brushes being inclined at an angle to the perpendicular of the air flow, the inclined filter brushes in this configuration presenting an apparent dense aspect to the air flow, the filter being effective, in this configuration, to scrub the dust and water spray without plugging and without excessive pressure drop in normal use and being effective to prevent stalling and excessive noise of the scrubber fan, but also being effective to maintain sufficient pressure drop to produce effective scrubbing of dust particles from the air stream and prevent substantial entrainment of dust particles in the scrubbed air stream, the filter being effective to be rapidly cleaned and returned to service with periodic maintenance in regular use.

2. The method of claim 1 wherein the pressure drop across the filter is less than about 4 inches of water.

3. The method of claim 2 wherein the pressure drop across the filter is between about 3-4 inches of water.

4. The method of claim 2 wherein the air flow across the filter is between about 6,500-7,000 cfm.

5. The method of claim 1 wherein the brushes are nylong brushes helically wound on a wire core.

6. The method of claim 5 wherein the brushes are would on a pitch of about 5-6 turns per inch.

7. The method of claim 1 wherein the brushes have a diameter of between about 1 to 1½ inches.

8. The method of claim 1 wherein the axes of the brushes are substantially co-planar.

9. The method of claim 1 wherein the bristles of adjacent brushes are interdigitated.

10. The method of claim 9 wherein the bristles of adjacent brushes overlap between about 25-50% of the diameter of the brushes.

11. In an underground mining machine having a flooded bed scrubber for removing dust particles, generated by the operation thereof, from the surrounding air, the improvement comprising a filter positioned in the mining machine scrubber, the mining machine scrubber having an intake duct for dust containing air, water sprays for scrubbing the dust containing air, disentrainment baffles for demisting the scrubbed air, a fan for propelling air through the mining machine scrubber and an outlet duct for scrubbed air, the filter being a removable filter positioned in the scrubber and having a plurality of brushes mounted in a frame, the brushes being spaced apart in the frame, the brushes being flexible bristles extending outwardly from axial cores, the brushes being placed in the frame with the cores thereof substantially parallel, the filter being positioned in the mining machine scrubber and extending substantially across the scrubber and the flow of dust containing air and water spray, the filter being positioned with the axes of the brushes inclined at an angle to the perpendicular of the air flow, the inclined filter brushes in this configuration providing means for presenting an apparent dense aspect to the air flow effective to scrub the dust and water spray without plugging, being effective to scrub the dust containing air without excessive pressure drop in normal use and being effective to prevent stalling of the scrubber fan, the filter also providing means for maintaining sufficient pressure drop in the scrubber to product effective scrubbing of the dust particles from the air stream and prevent substantial entrainment of dust particles in the scrubbed air stream, the filter providing means for rapidly cleaning dust particles held thereon from the filter to permit the filter to be rapidly returned to service with periodic maintenance in regular use.

12. The device of claim 11 wherein the brushes are nylon brushes helically wound on a wire core.

13. The device of claim 12 wherein the brushes are wound on a pitch of about 5-6 turns per inch.

14. The device of claim 11 wherein the brushes have a diameter of between about 1 to 1½ inches.

15. The device of claim 11 wherein the axes of the brushes are substantially co-planar.

16. The device of claim 11 wherein the bristles of adjacent brushes are interdigitated.

17. The device of claim 16 wherein the bristles of adjacent brushes overlap between about 25-50% of the diameter of the brushes.

18. The device of claim 11 wherein the filter is at an angle of between about 30-60 degrees to the perpendicular of the air flow direction.

19. The device of claim 18 wherein the angle is about 45 degrees.

20. The device of claim 11 wherein the axial cores of the brushes are substantially co-planar.

* * * * *

UNITED STATES PATENT AND TRADEMARK OFFICE
CERTIFICATE OF CORRECTION

PATENT NO. : 4,787,920
DATED : November 29, 1988
INVENTOR(S) : Donald E. Richard It is certified that error appears in the above-identified patent and that said Letters Patent are hereby corrected as shown below:

Column 1, Line 29, delete "particular" and insert --particularly--.

Column 2, Line 1, delete "THe" and insert --The--.
Column 2, Line 3, delete "jfor" and insert --for--.
Column 2, Line 21, delete "inchesof" and insert --inches of--.
Column 2, Line 36, delete "cakes" and insert --caked--.
Column 2, Line 37, delete "throught" and insert --through out--.

Column 4, Line 22, delete "wells" and insert --well--.

Column 5, Line 18, delete "nylong" and insert --nylon--.
Column 5, Line 20, delete "would" and insert --wound--.

Column 6, Line 15, delete "product" and insert --produce--.

Signed and Sealed this

Twenty-eighth Day of March, 1989

Attest:

DONALD J. QUIGG

Attesting Officer  Commissioner of Patents and Trademarks